United States Patent [19]

Gillem

[11] Patent Number: 4,605,814
[45] Date of Patent: Aug. 12, 1986

[54] LIGHTNING DETERRENT

[76] Inventor: Vernon A. Gillem, 9777 86th Ave. N., Seminole, Fla. 33543

[21] Appl. No.: 663,415

[22] Filed: Oct. 22, 1984

Related U.S. Application Data

[63] Continuation-in-part of Ser. No. 436,042, Oct. 22, 1982, abandoned.

[51] Int. Cl.$^4$ ............................................. H02G 13/00
[52] U.S. Cl. ........................................ 174/2; 174/4 R
[58] Field of Search ............... 174/2, 3, 4 R; 361/117, 361/212, 215, 216, 220, 222, 231; 455/117

[56] References Cited

U.S. PATENT DOCUMENTS

| | | | |
|---|---|---|---|
| 1,096 | 3/1839 | Barber | 174/4 R |
| 315,679 | 4/1885 | Upton | 174/2 |
| 357,050 | 2/1887 | Vail | 174/2 X |
| 1,617,788 | 2/1927 | Baldwin et al. | 174/2 |
| 1,743,526 | 1/1930 | Cage | 174/2 |
| 1,757,172 | 5/1930 | Cazel et al. | 174/4 R X |
| 1,974,315 | 9/1934 | Schaeffer | 174/2 |
| 4,180,698 | 12/1979 | Carpenter, Jr. | 174/2 |

Primary Examiner—Laramie E. Askin
Attorney, Agent, or Firm—Lowe, Price, LeBlanc, Becker & Shur

[57] ABSTRACT

A lightning deterrent device is described which consists of a brush-like conductive structure particularly suited to be mounted on the top of a transmission tower. The device includes a central core formed into an annulus having a diameter sufficient to contain the vertical sides of the tower. The central core mounts a plurality of conductive wires captured therein at their midpoints. Sufficient wires are used to form a brush-like structure. The maximum number of wires is 250 per inch. The wires are preferably 10 inches long and have a diameter of about 0.014 inch. The device has been found to reliably protect against lightning strikes, and in the case of a television transmission tower, increase the signal by over 25 miles.

10 Claims, 8 Drawing Figures

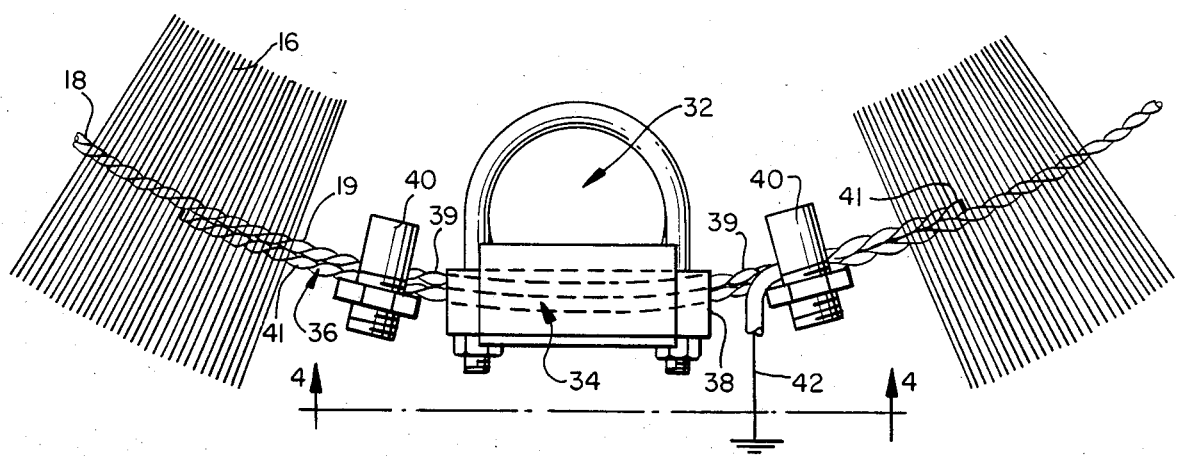
FIG. 3.
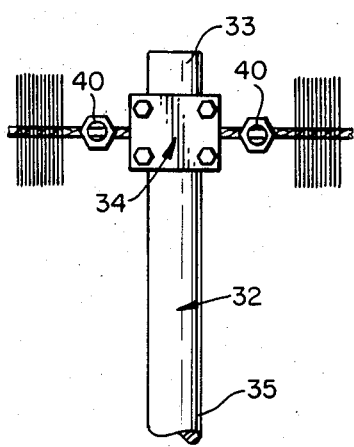
FIG. 4.
FIG. 5.
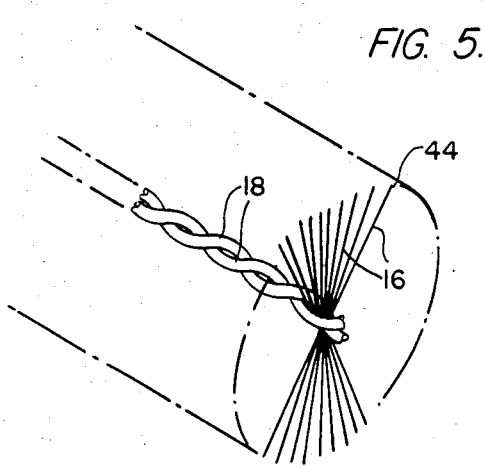
FIG. 6.
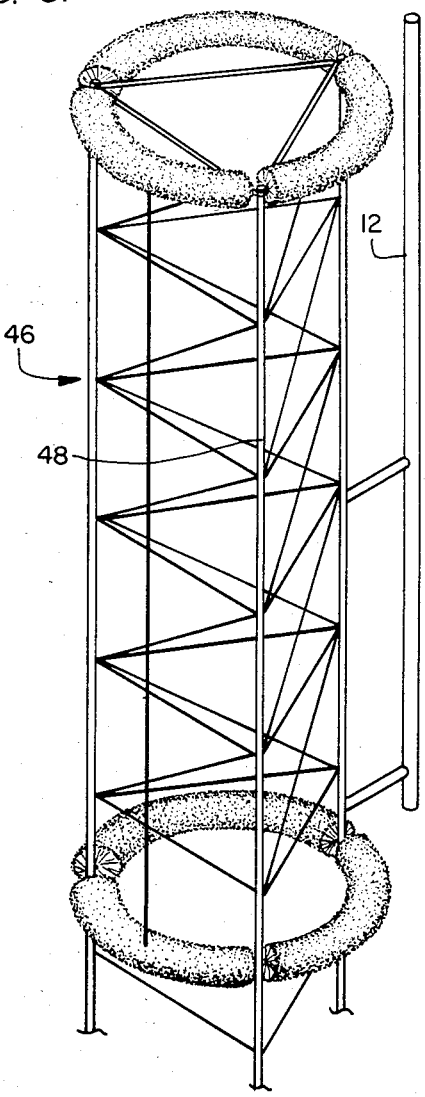

LIGHTNING DETERRENT

This application is a continuation-in-part of my parent application Ser. No. 436,042, filed Oct. 22, 1982, now abandoned.

This invention relates to an apparatus for protecting structures from lightning strikes and for reducing radio frequency electrical noise in broadcast signals.

Protection from lightning strikes continues to be a particular problem for radio and television transmission towers. Lightning can cause substantial damage to the tower and to the electronics used in conjunction with broadcasting. Lightning rods which function to ground a lightning strike do not totally prevent damage. A lightning strike to a transmission tower may cause serious damage even though it strikes a lightning rod. Accordingly, it is desirable to provide an apparatus to protect such structures by preventing the lightning strike by dissipating a charge build-up on the structure before the strike occurs.

It is known that conductive, pointed wires may be used to dissipate ions from structures which are electrically coupled to the wires. This phenomenon is known as point discharge. The point discharge phenomenon has been used to dissipate static electricity from airplanes as described in U.S. Pat. Nos. 2,497,942; 3,528,629; and 3,617,805.

It is also known to protect structures such as oil storage tanks with a network of such wires. See, for example, U.S. Pat. Nos. 1,743,526 and 1,617,788. In U.S. Pat. No. 1,743,526, the structure, an oil tank, is surrounded by poles which are grounded, and barbed wire is strung on the tops of the poles ringing the structure. The barbed wire used is that commonly used for fencing, and the barbs thereon are described as being used for dissipating a build-up charge on the structure. The barbed wire functions principally to dissipate secondary effects at surrounding points which could have a charge density nearly as high as that point where a discharge occurs. In an oil tank reservoir, even though a lightning strike may be at a considerable distance, the secondary effect can ignite gases.

In U.S. Pat. Nos. 2,033,321 and 2,440,072, groups of conductive wires formed into brushes are used for removing ions from charged surfaces. These patents require physical contact between the ends of the wires and the charge surface to dissipate the static electricity.

Groups of conductive wires or pointed conductive elements have also been described as a mechanism for protecting structures from being struck by lightning in Italian Pat. No. 262,841 and U.S. Pat. Nos. 1,193,848 and 4,180,698.

None of the prior art known to applicant teaches a reliable means for protecting an extremely tall structure such as a transmission tower.

It has been discovered that transmission towers can be protected against lightning strikes reliably with the device of this invention wherein the protective element is a toroid formed of conductive wire with a brush-like series of individual wires mounted on a central core. Reliable protection has been achieved with the device of this invention wherein such a wire brush toroid is mounted above and surrounding the transmission tower. The individual wire elements do not touch the tower structure directly but function to dissipate a charge build-up before a lightning strike can occur. The device of this invention has been successfully tested and found to achieve reliable and effective protection for transmission towers as will be subsequently described.

In the preferred embodiment of this invention, a transmission tower may be effectively protected against lightning strikes by providing an array of conductive wires in sufficient number to achieve a brush-like structure in the form of a toroid. The minimum diameter D of the toroid is that of a circle which has its center at the centroid of the highest altitude cross section of the structure and whose diameter passes through the centroid of the highest altitude cross section and the peripheral point located farthest from the centroid. The array provides a path for dissipating negative ion accumulation on the structure before the resultant electric field reaches a potential of sufficient magnitude to ionize the air between the structure and a charged cloud disposed above the structure. The lightning deterrent of this invention is intended for use on a structure erected above sea level having a diameter D at its highest point. The deterrent includes a conductive core of a length L with a plurality of wires, each joined to the conductive core in a uniform density per unit length along the length L of the conductive core. Each wire is joined to the conductive core in proximity to its center to form the ion-dissipating structure of this invention.

The diameter D as used herein is determined by forming a circle of diameter D which has as its center the centroid of the cross section of the highest elevation of the structure to be protected and which has a circumference which passes through the points of the structure located farthest from the centroid. In the case of transmission towers with triangular cross sections, the circumference passes through the three corners. In the case of transmission towers with rectangular cross sections, the circumference passes through the four corners. In the case of transmission towers with circular cross sections, the circumference coincides with the outside circumference of the transmitter.

The length L which coincides with $\pi D$, in fact, is a minimum length. The length may be increased to a greater quantity to accommodate spacing between other objects also mounted on the structure being protected. When the length L of the conductive core is greater than $\pi D$, the same quantity or the same predetermined density of conductive wires per unit length may be used as would be used with the minimum length of the conductive core. Therefore, the increase in length may result in a greater number of wires.

The preferred material for use in the device of this invention is an antimagnetic grade of stainless steel such as No. 303, and it is preferred to use stainless steel in the wires themselves. Antimagnetic grades of stainless steel may lessen the accumulation of dirt on the wires which could interfere with the dissipation of ions. The preferred individual wires are of a diameter of 0.014 inch and about 10 inches long.

The preferred shape of the conductive core is a circle with the individual wires forming a doughnut-shaped toroid. As noted above, the periphery of the circle defined by the conductive core should preferably extend out to and/or past the farthest extension of the cross section of the point of highest elevation on the structure to be protected so that the ends of the wires of the toroid will extend beyond the vertical plane or planes which contain the sides of the structure to be protected.

In an embodiment of this invention, a conductive core is formed in a loop and a plurality of wires each joined to the conductive core are provided in a uniform density per unit length not to exceed about 250 wires per inch. The core is mounted with a mounting structure having a plurality of members each having first and second ends. The first end of each such member is coupled to a different point on the loop of the conductive core to form a support for the conductive core. The second ends are adapted to be coupled to the top of the transmission tower.

Accordingly, it is an object of this invention to provide a device for dissipating ion charges from tall structures, such as transmission towers, to reliably protect said towers from lightning strikes.

It is another object of this invention to provide a brush-like structure which surrounds the top of a transmission tower to dissipate ion charges which build thereon.

It is yet another object of this invention to provide a toroidal-shaped brush-like structure of metal elements on a conductive core which is mounted above a transmission tower, connected thereto, and which surrounds the plane or planes containing the vertical sides of said structure.

These and other objects will become readily apparent with reference to the drawings and following description wherein:

FIG. 3 is a fragmentary view of a deterrent structure of this invention illustrating the mounting means.

FIG. 4 is a side view taken in the direction of line 4—4 of FIG. 3 showing the mounting means of FIG. 3 and illustrating a support pole.

FIG. 5 is a fragmentary cross section, illustrating the configuration of conductive wires on a central core of the device of this invention.

FIG. 6 is a perspective view illustrating the mounting of the device of this invention with an optional additional lightning deterrent mounted at the midpoint of the structure to be protected.

Figure 1:
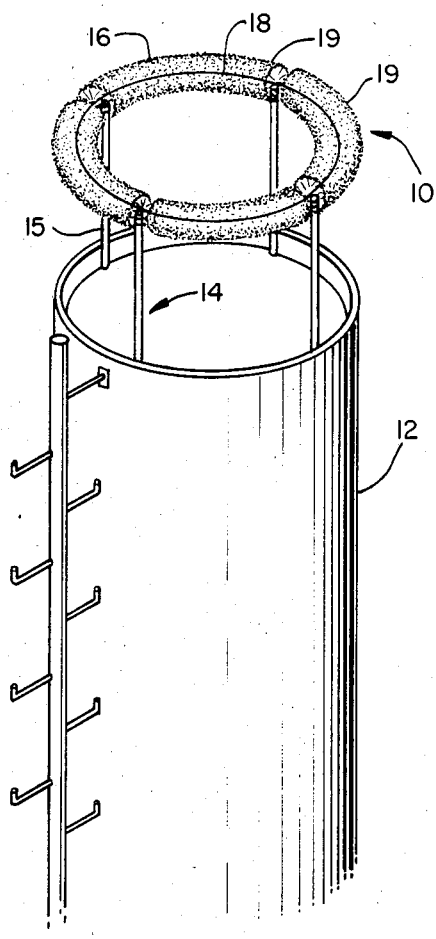
FIG. 1 is a perspective view of the device of this invention mounted on a tower having a circular cross section.

With attention to the drawings, and to FIG. 1 in particular, the lightning deterrent 10 of this invention is attached to the top of a transmission tower 12 having a circular cross section. Transmitter 12 is of the type typically used for broadcasting television signals. The device 10 of this invention is connected to the highest elevation of the structure 12 by a mounting structure 14 which has a plurality of members 15. The construction of the mounting structure 14 will be discussed subsequently. The lightning deterrent 10 preferably has a circular configuration. The lightning deterrent 10 includes a number of conductive wires 16 which are attached to the central core 18 as shown in FIG. 5. The central core 18 is comprised of arcuate sections 19 as shown in FIGS. 3 and 4 which form the preferred circular configuration, and is attached to the mounting structure 14 at three or more locations. It should be understood that the invention is not limited to a circular configuration of the central core 18 and can include a closed loop which is noncircular. The invention is not intended to be limited to the particular form of the mounting structure 14. The number of attachment points between the lightning deterrent 10 and mounting structure 14, and the number of attachment points between the mounting structure 14 and the top of the transmitter 12 are not critical. As will be obvious to those skilled in the art, the only criteria which must be satisfied in mounting the deterrent 10 to the structure 12 is that the installation should be sufficiently rigid to withstand high winds and heavy precipitation.

The number of wires used in the deterrent 10 of this invention is a number sufficient to form the brush-like toroid. See FIGS. 2A–2C. A lightning deterrent 10 in accordance with this invention has been proven, as will be subsequently described, to be effective in preventing lightning strikes to television transmitters and, in addition, has been found to improve the signal-to-noise ratio of a broadcast television signal by over 35% after installation. The invention is not intended to be limited to the number of wires 16.

Figure 2A:
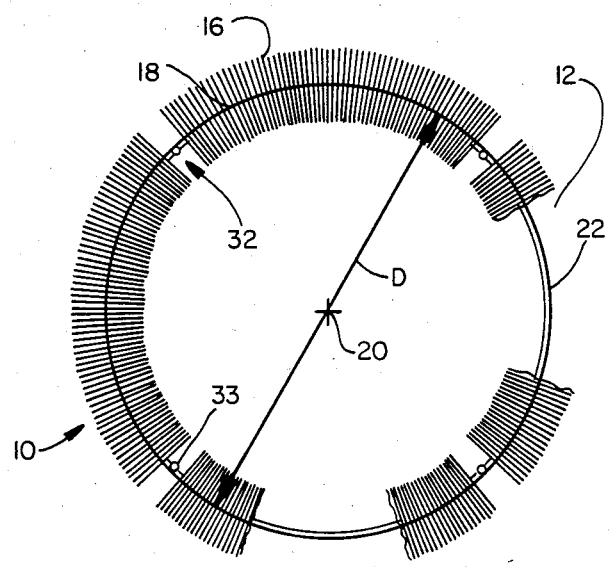
FIG. 2A is a top view of a deterrent structure of FIG. 1.
Figure 2B:
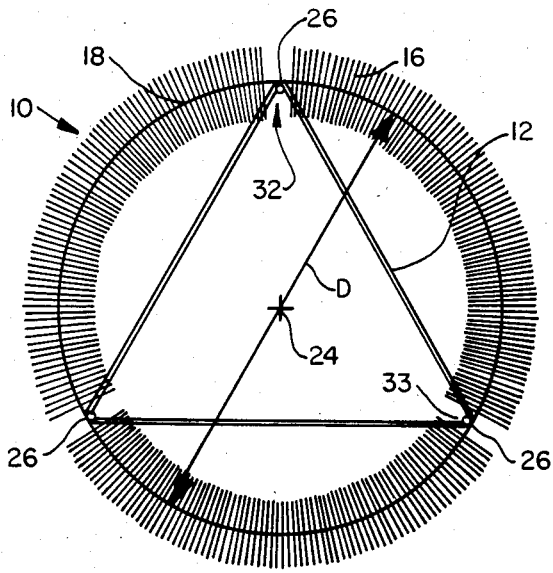
FIG. 2B is a view similar to FIG. 2A wherein the structure to be protected is triangular in cross section.
Figure 2C:
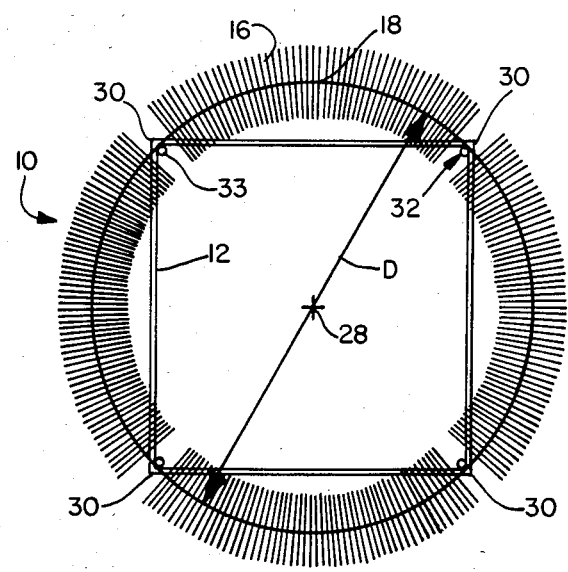
FIG. 2C is a view similar to FIG. 2A wherein the structure to be protected has a rectangular cross section.

In FIG. 2A, the diameter D passes through the centroid 20 of the circle and terminates at the outside circumference 22 of the highest altitude circular cross section of the transmitter 12 to be protected. In FIG. 2B, the diameter D passes through the centroid 24 of the highest altitude triangular cross section of the transmitter 12. The triangular cross section of the transmitter 12 has three vertices 26 through which a circle defined by the centroid 24 and the diameter D passes. Referring to FIG. 2C, the diameter D passes through the centroid 28 of the highest altitude rectangular cross section of the transmitter 12 to be protected. Diameter D defines a circle passing through the four vertices 30 of the highest altitude rectangular cross section of the transmitter 12 being protected. The aforementioned diameters D are used to calculate the minimum circumference or length L of the conductive core 18.

The length of the conductive core 18 used in the lightning deterrent 10 in accordance with the instant invention in the preferred embodiment should be equal to or greater than D. When the greater length of conductive core 18 is used, greater than the minimum length D, the density of wires 16 along the core may be kept at the same density which would be used with a minimum length of D per unit length, thereby resulting in a greater number of wires. In the alternative, the density may be decreased proportionately so that the density is reduced along the increased length L of the conductive core.

FIGS. 3 and 4, respectively, illustrate top and side views of the mounting structure 14 which may be used to attach the lightning deterrent 10 to the top of the structure 12 being protected. The mounting structure 14 includes a plurality of members 32 which typically are either 3 or 4 in number. The number of members 32 is determined by the size of the lightning deterrent 10 and should be sufficient to rigidly attach the lightning deterrent to the top of the transmitter tower 12, or other structure being protected. Each member 32 has first and second ends 33 and 35. A clamp 34 is attached to the first end 33 of each of the members 32. The clamp 34 has a conductive arcuate section of wire 36 attached to it which projects several inches past the edge 38 of the clamp. The lightning deterrent 10 is typically comprised of three or more arcuate sections 19 of the central core 18. Each arcuate section 19 has its ends 39 clamped to the ends 41 of the arcuate sections of wire 36 used to form the circle. Any suitable design of connector 40 may be used for attaching the ends 39 of the arcuate sections 19 of the conductive core 18 to the ends 41 of the arcuate sections of wires 36. A ground wire 42 is connected to one of the connectors 40 to provide a low resistance connection between the ground wire and the circular configuration of the central core 18. The ground wire may be attached to any of the connectors 40. The lengths of the members 32 are not critical. The second end 35 of each member 32 may be coupled to the top of the transmitter tower 12 by any suitable connection mechanism.

With reference to FIG. 5, the conductive wires 16 are shown as woven into the central core 18. The central core preferably is two or more stainless steel wires which have been twisted together to capture a plurality of conductive wires 16 at their midpoints. The apparatus used for twisting together the central core wires 18 to capture the conductive wires 16 is similiar to a lathe. The apparatus has a stationary clamp at one end and a rotary clamp at the other. The clamps engage the two or more conductive center core wires 18, and the individual wires 16 are fed in as the core wires 18 are twisted by rotation of the rotary clamp and captured to form a wire brush-like structure. In the preferred form of this invention, the wires 16 are 0.014 inch in diameter and are manufactured of antimagnetic grade stainless steel such as No. 303. Preferably, the wires are uniform in length and are attached in proximity to their center to provide a brush-like structure with a uniform diameter. It is believed that the use of antimagnetic grade of stainless steel may lessen the tendency for dirt to adhere to the individual wires 16 when the lightning deterrent 10 is mounted in areas with high air pollution. An accumulation of dirt on the individual wires 16 could have a deleterious effect on the ability of the wires to dissipate ions. The length of the individual wires 10 may be increased to enhance the ability of the lightning deterrent to dissipate a large number of ions. It is believed that the increased surface area provided by longer wires would enhance the ability to dissipate ions before an electrical potential is reached which is sufficient to cause an ionization path between the air in proximity to the lightning deterrent 10 and a cloud located above the deterrent.

It is believed that the maximum density of wires 16 per inch of core in proximity to the ends 44 which can effectively function to dissipate ions is 250 wires per inch. It is believed that the function of the individual wires 16 to dissipate ions would be deleteriously affected if their density increases past the aforementioned 250 wires per inch, in which case the ends 44 would be likely to touch each other. The maximum density of 250 wires per inch reflects the density of wires which may be attached to the central core 18 by the aforementioned method without any substantial numbers of wires 16 having their ends 44 in contact with each other. However, the invention is not limited to a maximum density of wires per inch in proximity to the ends 44.

FIG. 6 illustrates a lightning deterrent 10 in accordance with the invention to protect a side-mounted transmitter 46. Technically, a side-mounted transmitter has a boom 48 which is triangular, rectangular, or circular in cross section as shown in FIGS. 2A through 2C. Accordingly, the calculation of the diameter D which is used for determining the length L of the conductive core is the same as that described above. The lightning deterrent 10 may be mounted on the top of boom 48 by the same type of mechanism described in FIGS. 3 and 4. An additional lightning deterrent 10 may be mounted near the midpoint of the boom 48 to provide an additional dissipation of ions. When one or more lightning deterrents 10 are mounted on a structure to be protected, the individual deterrents should be electrically connected together and to ground.

EXAMPLE

The device of this invention was installed to protect a cable transmission tower for Channel 60, located on the Sears Tower in Chicago, Ill., in March of 1982. The tower height is 1,267 feet and the height above sea level is 1,700 feet. The diameter D was 3 feet. Individual wires were 0.014 inch in diameter and 10 inches in length. The conductive core was made of two strands of No. 8 wire, and had a length L in excess of $\pi$ times D such that when formed into an annular shape, the diameter was slightly greater than 4 feet. 30,500 wires were used to provide increased ion dissipating capability. The conductive core and the wires were made from a No. 303 antimagnetic grade stainless steel. Wires were disposed on the conductive core at a density of 180 wires per inch. There were a total of 4 arcuate sections used to make the circular center core, and the arcuate sections were clamped together by a mechanism similar to that in FIGS. 3 and 4.

A second transmission tower for the ABC Channel 7 was also located at the same site. The second tower was disposed 90 feet from the protected Channel 60 tower. Between March of 1982 and August of 1982, the unprotected tower only was hit by numerous lightning strikes. In August of 1982, a deterrent of this invention was also installed on the Channel 7 tower. Since the installation of each deterrent, there has been no instance of lightning strikes to date, even though both towers have gone through over 32 direct overhead thunder storms.

It was also discovered that after installation of the device of this invention, the broadcast signal of Channel 7 was estimated to be increased by over 25 miles as compared to prior to installation of the device of this invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A lightning deterrent for protecting a tall structure such as a tansmission tower comprising:
   an electrically conductive core formed in an annular configuration and having a length at least sufficient to contain the vertical plane or planes which contain the vertical sides of the structure to be protected at its highest point;
   a multiplicity of electrically conductive wires, each joined substantially at its midpoint to said core, said wires being disposed along the length of said core in a substantially uniform density per inch of length in a number sufficient to form a brush-like structure wherein the free ends of substantially all of said wires are out of contact with adjacent wires and the density thereof does not exceed about 250 wires per inch; and
   means for mounting said core on a structure to be protected above the highest point thereof.

2. The deterrent of claim 1 wherein said core comprises strands of Number 8 wire twisted together.

3. The deterent of claim 2 wherein each of said multiplicity of wires is about 10 inches long and has a diameter of about 0.014 inch.

4. The deterrent of claim 1 wherein said core and multiplicity of wires are of Number 303 stainless steel.

5. The deterrent of claim 1 wherein said core is configured substantially in a circle and said brush-like structure is shaped as a toroid.

6. The deterrent of claim 1 wherein said mounting means comprises means for attaching said core to the top of the structure to be protected so that said core and multiplicity of wires are spaced above the high point thereof.

7. The deterrent of claim 6 wherein said mounting means further comprises a plurality of mutually spaced upright braces, and clamping means at either end of each brace for engaging, respectively, said core and the structure to be protected.

8. The deterrent of claim 1 wherein the density of said wires about said core is about 180 wires per linear inch of said core.

9. The deterrent of claim 1 further comprising:
a second conductive, annular core having a length sufficient to surround the midpoint of the structure to be protected;
a multiplicity of conductive wires, each joined at its midpoint to said second core and disposed in a substantially uniform density along the length thereof to form a brush-like structure having a maximum density of no more than about 250 wires per inch of said second core; and
second mounting means for mounting said second core surrounding substantially the midpoint of the structure to be protected.

10. The deterrent of claim 9 wherein said second core and wires joined thereto are constructed of the same materials as the first core and wires joined thereto.

* * * * *